(12) United States Patent
Chen et al.

(10) Patent No.: US 7,459,101 B2
(45) Date of Patent: Dec. 2, 2008

(54) ENVIRONMENTALLY FRIENDLY ALTERNATIVE REFRIGERANT FOR HCFC-22

(75) Inventors: Guangming Chen, Hangzhou (CN); Zhikal Guo, Hangzhou (CN); Xinzheng Guo, Hangzhou (CN); Yongmei Xuan, Hangzhou (CN)

(73) Assignee: Zhejiang Lantian Environmental Protection Hi-Tech Co. Ltd., Hangzhou, Zhejiang, P.R. (CN)

( * ) Notice: Subject to any disclaimer, the term of this patent is extended or adjusted under 35 U.S.C. 154(b) by 52 days.

(21) Appl. No.: 11/221,777

(22) Filed: Sep. 9, 2005

(65) Prior Publication Data
US 2006/0001001 A1    Jan. 5, 2006

Related U.S. Application Data

(63) Continuation of application No. PCT/CN2004/000319, filed on Apr. 8, 2004.

(30) Foreign Application Priority Data

May 7, 2003    (CN)    ................................ 03 1 16856

(51) Int. Cl.
*C09K 5/04*    (2006.01)
(52) U.S. Cl. ............................. 252/67; 62/114; 510/408
(58) Field of Classification Search ................... 252/67, 252/68, 2; 62/114, 498, 502; 510/410
See application file for complete search history.

(56) References Cited

U.S. PATENT DOCUMENTS

| | | | | |
|---|---|---|---|---|
| 5,403,504 A | * | 4/1995 | Bivens et al. | 252/67 |
| 5,531,080 A | * | 7/1996 | Hirahara et al. | 62/470 |
| 5,722,256 A | * | 3/1998 | Shiflett | 62/502 |

FOREIGN PATENT DOCUMENTS

| | | | |
|---|---|---|---|
| CN | 1063301 A | | 8/1992 |
| CN | 1136065 A | | 11/1996 |
| CN | 1280165 A | | 1/2001 |
| GB | 2298866 A | | 9/1996 |
| JP | 5-17755 | | 1/1993 |
| JP | 8-157810 | | 6/1996 |
| WO | WO 92/11338 | * | 7/1992 |

* cited by examiner

Primary Examiner—Stanley Silverman
Assistant Examiner—Kallambella Vijayakumar
(74) Attorney, Agent, or Firm—Jacobson Holman PLLC

(57) ABSTRACT

The present invention discloses ternary mixtures of fluoroethane (HFC-161), pentafluoroethane (HFC-125) and difluoromethane (HFC-32) used as environmentally friendly alternative refrigerants to HCFC-22. The mass ratios of the mixture of each component are 5-60%, 25-50% and 5-50%, respectively. Its ODP is zero, with no depletion potential to the ozone layer. Its GWP is smaller than those of HCFC-22, R407C and R410A. Its working pressure and pressure ratio are close to those of HCFC-22. With few changes to system components, it can be used as a potential substitute refrigerant for HCFC-22.

2 Claims, No Drawings

ENVIRONMENTALLY FRIENDLY ALTERNATIVE REFRIGERANT FOR HCFC-22

This is a continuation application of PCT/CN2004/000319, filed on Apr. 8, 2004 and published in Chinese.

FIELD OF THE INVENTION

The present invention relates to a refrigerant, and more specifically, relates to an environmentally friendly refrigerant, which can be used as an alternative fluid to HCFC-22 (Chlorodifluoromethane, or R22).

DESCRIPTION OF THE RELATED ART

Among the hydrogen-cholrofluorocarbon refrigerants, HCFC-22 is presently broadly used in refrigeration and air conditioning because of its favorable characteristics in thermodynamics, chemistry and physics.

However, HCFC-22 has depletion potential to ozone layer in the stratosphere. Its ODP (Ozone Depletion Potential) is 0.055 (using CFC-11 as reference 1.0). According to Montreal Protocol and its amendments, HCFC-22 should be phased out before year 2020 in developed countries and before year 2030 in developing countries.

Furthermore, HCFC-22 has another environmental problem. Its GWP (Global Warming Potential) is 1700 (using $CO_2$ as reference 1.0, 100 years), and is presently one of the greenhouse gases under the control of Kyoto Protocol. Therefore, it is absolutely necessary to investigate alternative refrigerants to HCFC-22.

Present researches discovered that no one pure substance would be close to or better than HCFC-22 in terms of COP (Coefficient of Performance) value and volumetric cooling capacity. Mixtures including hydrofluorocarbons are usually used as alternative refrigerants. Presently, R407C and R410A are two main recommended alternative refrigerants.

R407C is a ternary mixture of HFC-32, HFC-125 and HFC-134a. Its evaporative pressure and condensing pressure are similar to those of HCFC-22, which is its main advantage as a substitution for HCFC-22. R407C is a non-azeotropic mixture. Its temperature glide is large, which leads to composition change when there is leakage. Therefore, such composition change has an unfavorable influence on system performance.

R410A is a binary mixture of HFC-32 and HFC-125. Its temperature glide is small and it is a near-azeotropic mixture. R410A cannot be retrofitted directly, because its operation pressure and volumetric capacity are higher than those of HCFC-22. Due to these reasons, compressors and the other main components of refrigeration systems must be redesigned when using R410A.

From the viewpoint of environment protection, although both R407C and R410A have zero ODP, they have high GWP. In order to control the releasing of greenhouse effect gases, the present invention discloses an HFC refrigerant as a new alternative refrigerant to HCFC-22.

SUMMARY OF THE INVENTION

An object of the present invention is to provide an environmentally friendly refrigeration fluid, which can be used as a substitute for HCFC-22.

According to the present invention, there is provided a refrigeration fluid comprising 5-60% by mass of fluoroethane (HFC-161), 25-50% by mass of pentafluoroethane (HFC-125) and 5 to 50% by mass of difluoromethane (HFC-32).

The present invention has the following advantages.

1. It is a near-azeotropic composition. Its temperature glide is smaller than that of R407C.

2. It is environmentally friendly. Its ODP is zero. Its GWP is lower than both HCFC-22 and its main alternative refrigerants R407C and R410A.

3. Its thermodynamic characteristics such as pressure ratio and operation pressures are close to those of HCFC-22. Without changing the main equipment in a refrigeration system, its thermodynamic parameters such as cooling capacity per unit mass and discharge temperature are better than those of HCFC-22. Although its COP value is lower than HCFC-22, it is greater than those of R410A and R407C. Therefore, the present invention can be a long term alternative to HCFC-22. In addition, less charge mass is needed according to the present invention.

DETAILED DESCRIPTION OF THE INVENTION

An object of this invention is to provide a novel alternative refrigerant to HCFC-22, which has zero ozone depletion potential, and low global warming potential. Furthermore, the refrigerant disclosed has similar thermodynamic properties with HCFC-22, and can be a direct substitute for HCFC-22.

The present invention discloses a novel refrigerant, characterized in that it comprises 5-60% by mass of fluoroethane (HFC-161), 25-50% by mass of pentafluoroethane (HFC-125) and 5 to 50% by mass of difluoromethane (HFC-32).

The preferred compositions comprise 30-60% by mass of fluoroethane (HFC-161), 25-50% by mass of pentafluoroethane (HFC-125) and 5 to 35% by mass of difluoromethane (HFC-32).

The more preferred compositions comprise 40-50% by mass of fluoroethane (HFC-161), 30-45% by mass of pentafluoroethane (HFC-125) and 10 to 25% by mass of difluoromethane (HFC-32).

The most preferred compositions comprise 43-47% by mass of fluoroethane (HFC-161), 36-40% by mass of pentafluoroethane (HFC-125) and 16 to 20% by mass of difluoromethane (HFC-32).

The preparation method of this novel fluid is to mix each liquid component according to the mass percentage ratio.

In the above compositions, the molecular formula of fluoroethane (HFC-161) is $CH_3CH_2F$. Its molecular weight is 48.06. Its normal boiling point is $-37.1°$ C. Its critical temperature is $102.2°$ C. Its critical pressure is 4.7 MPa.

In the above compositions, the molecular formula of pentafluoroethane (HFC-125) is $CHF_2CF_3$. Its molecular weight is 120.02. Its normal boiling point is $-48.1°$ C. Its critical temperature is $66.2°$ C. Its critical pressure is 3.63 MPa.

In the above compositions, the molecular formula of difluoromethane (HFC-32) is $CH_2F_2$. Its molecular weight is 52.02. Its normal boiling point is $-51.7°$ C. Its critical temperature is $78.2°$ C. Its critical pressure is 5.78 MPa.

The present invention will be illustrated by referring to the following Examples.

EXAMPLE 1

HFC-161, HFC-125 and HFC-32 are mixed in liquid phase according to the percentage ratio by mass of 5:50:45.

EXAMPLE 2

HFC-161, HFC-125 and HFC-32 are mixed in liquid phase according to the percentage ratio by mass of 5:45:50.

EXAMPLE 3

HFC-161, HFC-125 and HFC-32 are mixed in liquid phase according to the percentage ratio by mass of 25:25:50.

EXAMPLE 4

HFC-161, HFC-125 and HFC-32 are mixed in liquid phase according to the percentage ratio by mass of 20:40:40.

EXAMPLE 5

HFC-161, HFC-125 and HFC-32 are mixed in liquid phase according to the percentage ratio by mass of 15:35:50.

EXAMPLE 6

HFC-161, HFC-125 and HFC-32 are mixed in liquid phase according to the percentage ratio by mass of 50:40:10.

EXAMPLE 7

HFC-161, HFC-125 and HFC-32 are mixed in liquid phase according to the percentage ratio by mass of 30:35:35.

EXAMPLE 8

HFC-161, HFC-125 and HFC-32 are mixed in liquid phase according to the percentage ratio by mass of 60:35:5.

EXAMPLE 9

HFC-161, HFC-125 and HFC-32 are mixed in liquid phase according to the percentage ratio by mass of 40:25:35.

EXAMPLE 10

HFC-161, HFC-125 and HFC-32 are mixed in liquid phase according to the percentage ratio by mass of 45:50:5.

EXAMPLE 11

HFC-161, HFC-125 and HFC-32 are mixed in liquid phase according to the percentage ratio by mass of 15:50:35.

EXAMPLE 12

HFC-161, HFC-125 and HFC-32 are mixed in liquid phase according to the percentage ratio by mass of 30:50:20.

EXAMPLE 13

HFC-161, HFC-125 and HFC-32 are mixed in liquid phase according to the percentage ratio by mass of 60:25:15.

EXAMPLE 14

HFC-161, HFC-125 and HFC-32 are mixed in liquid phase according to the percentage ratio by mass of 45:37:18.

The characteristics of each Example are compared with HCFC-22 and its main replacements R407C and R410A in order to illustrate the features and effects of the present invention.

a. Near-Azeotrope

TABLE 1

Comparison of Temperature Glide, ° C.

| | Bubble Point | Dew point | Temperature glide | | Bubble Point | Dew point | Temperature glide |
|---|---|---|---|---|---|---|---|
| Example 1 | −51.52 | −51.33 | 0.19 | Example 8 | −42.93 | −39.87 | 3.06 |
| Example 2 | −51.66 | −51.53 | 0.13 | Example 9 | −50.23 | −46.41 | 3.82 |
| Example 3 | −51.48 | −50.15 | 1.33 | Example 10 | −44.13 | −41.16 | 2.97 |
| Example 4 | −51.09 | −49.69 | 1.4 | Example 11 | −50.92 | −49.77 | 1.15 |
| Example 5 | −51.62 | −51.08 | 0.54 | Example 12 | −48.92 | −45.52 | 3.40 |
| Example 6 | −45.59 | −41.52 | 4.07 | Example 13 | −46.44 | −41.41 | 5.03 |
| Example 7 | −50.51 | −47.73 | 2.78 | Example 14 | −47.86 | −43.32 | 4.54 |
| R407C | −43.81 | −36.72 | 7.09 | | | | |

(Note:
The bubble point and dew point temperatures in Table 1 are saturation temperatures corresponding to standard atmosphere, 101.325 kPa)

As shown in Table 1, the temperature glide of each Example mixture is smaller than hat of R407C. Therefore, they belong to near-azeotropic refrigerant.

b. Environmental Characteristics

The environmental characteristics of each Example mixture and HCFC-22, R407C, R410A are illustrated in Table 2. The ODP of CFC-11 is set to be 1.0. The GWP of $CO_2$ is set to be 1.0 (100 years).

TABLE 2

Comparison of Environmental Characteristics

| | ODP | GWP | | ODP | GWP |
|---|---|---|---|---|---|
| Example 1 | 0 | 1325 | Example 8 | 0 | 612 |
| Example 2 | 0 | 1221 | Example 9 | 0 | 622 |
| Example 3 | 0 | 728 | Example 10 | 0 | 965 |
| Example 4 | 0 | 999 | Example 11 | 0 | 1232 |
| Example 5 | 0 | 955 | Example 12 | 0 | 1096 |
| Example 6 | 0 | 759 | Example 13 | 0 | 485 |
| Example 7 | 0 | 842 | Example 14 | 0 | 752 |
| HCFC-22 | 0.055 | 1700 | R407C | 0 | 1370 |
| R410A | 0 | 1370 | | | |

The data in Table 2 indicate that each Example mixture has zero ODP, with no depletion potential to ozone layer, which is better than HCFC-22.

Furthermore, the GWP of each Example mixture is smaller than HCFC-22, R407C and R410A. The GWP of each Example mixture only accounts for 29 to 78% of the GWP of HCFC-22, 35 to 97% of GWP of R407C and R410A.

c. Thermodynamic Parameters and Properties

Thermodynamic parameters (evaporative pressure $P_0$, condensing pressure $P_k$, pressure ratio $P_k/P_0$, discharge temperature $t_2$) as well as relative thermodynamic properties (relative COP, relative cooling capacity per unit mass $q_0$, relative volumetric cooling capacity $q_v$, compressor power consumption per unit volume $w_v$) of each Example mixture are compared with those of HCFC-22, R407C and R410A in Table 3 under the conditions wherein the evaporative temperature is 7° C., the condensing temperature is 55° C., the suction temperature is 18° C. and the subcooling temperature is 50° C. The relative thermodynamic properties herein refer to the cycle performances comparison of alternative refrigerant (each Example mixture, R407C and R410A) with those of HCFC-22.

TABLE 3

| | Comparison of Thermodynamic Parameters | | | | | | | |
|---|---|---|---|---|---|---|---|---|
| | $P_0$ (MPa) | $P_k$ (MPa) | $\dfrac{p_k}{p_0}$ | $t_2$ (° C.) | Relative COP | Relative $q_0$ | Relative $q_v$ | Relative $w_v$ |
| Example 1 | 0.974 | 3.355 | 3.45 | 93.46 | 0.91 | 0.99 | 1.37 | 1.51 |
| Example 2 | 0.980 | 3.387 | 3.46 | 95.58 | 0.91 | 1.04 | 1.39 | 1.54 |
| Example 3 | 0.930 | 3.202 | 3.44 | 98.20 | 0.93 | 1.26 | 1.36 | 1.46 |
| Example 4 | 0.914 | 3.154 | 3.45 | 93.97 | 0.92 | 1.11 | 1.31 | 1.43 |
| Example 5 | 0.958 | 3.300 | 3.45 | 96.87 | 0.92 | 1.15 | 1.38 | 1.50 |
| Example 6 | 0.670 | 2.381 | 3.55 | 88.49 | 0.97 | 1.27 | 1.02 | 1.06 |
| Example 7 | 0.862 | 2.992 | 3.47 | 94.16 | 0.93 | 1.20 | 1.26 | 1.35 |
| Example 8 | 0.617 | 2.203 | 3.57 | 87.80 | 0.98 | 1.36 | 0.97 | 0.98 |
| Example 9 | 0.828 | 2.888 | 3.49 | 95.91 | 0.94 | 1.33 | 1.24 | 1.31 |
| Example 10 | 0.650 | 2.311 | 3.56 | 85.31 | 0.96 | 1.16 | 0.99 | 1.02 |
| Example 11 | 0.914 | 3.156 | 3.45 | 91.20 | 0.91 | 1.01 | 1.29 | 1.41 |
| Example 12 | 0.790 | 2.766 | 3.50 | 88.80 | 0.93 | 1.08 | 1.15 | 1.23 |
| Example 13 | 0.675 | 2.402 | 3.56 | 92.10 | 0.97 | 1.44 | 1.05 | 1.08 |
| Example 14 | 0.730 | 2.579 | 3.53 | 90.90 | 0.96 | 1.26 | 1.10 | 1.15 |
| HCFC-22 | 0.622 | 2.176 | 3.50 | 97.97 | 1.00 | 1.00 | 1.00 | 1.00 |
| R407C | 0.641 | 2.346 | 3.66 | 88.06 | 0.94 | 0.95 | 0.97 | 1.03 |
| R410A | 0.990 | 3.425 | 3.46 | 93.05 | 0.90 | 0.98 | 1.40 | 1.55 |

The results presented in Table 3 indicate that under the above working conditions, the condensing pressures, evaporative pressures and pressure ratios of Example mixtures 6, 8,10,13 are in safe operating range, and are close to that of HCFC-22. Therefore, they can be used as direct substitutes for HCFC-22. The discharge temperatures of Example mixtures 6, 8,10,13 are lower than that of HCFC-22, and close to or even lower than those of R407C and R410A. The cooling capacities per unit mass of Example mixtures 6, 8,10,13 are higher than those of HCFC-22, R407C and R410A. Therefore, less charge mass is needed for replacement of HCFC-22, R407C and R410A. Their COP is higher than those of R407C and R410A, which means that they have energy saving effect. Furthermore, their volumetric cooling capacities and compressor power consumptions per unit volume are nearly equal to those of HCFC-22 and R407C. Therefore, compressors for HCFC-22 and R407C can be used directly with the alternative refrigerant and few alternations or replacements are required.

Although the volumetric cooling capacities and compressor power consumptions per unit volume of Example mixtures 1, 2, 3, 4, 5, 7, 9, 11, 12 and 14 are higher than those of HCFC-22 and R40C7, they are smaller than that of R410A. Compressors for R410A can be used directly with the alternative refrigerant and few alternations or substitution are required.

What is claimed is:

1. An environmentally friendly fluid for use in refrigeration and air-conditioning systems, wherein said fluid consists of 40-50% by mass of fluoroethane, 35-45% by mass of pentafluoroethane, and 10-25% by mass of difluoromethane.

2. An environmentally friendly fluid for use in refrigeration and air-conditioning systems, wherein said fluid consists of 43-47% by mass of fluoroethane, 36-40% by mass of pentafluoroethane, and 16-20% by mass of difluoromethane.

* * * * *